(12) United States Patent
Seo et al.

(10) Patent No.: US 11,280,951 B2
(45) Date of Patent: Mar. 22, 2022

(54) VEHICLE PANEL FOR EMITTING STEREOSCOPIC PATTERN

(71) Applicants: HYUNDAI MOTOR COMPANY, Seoul (KR); KIA MOTORS CORPORATION, Seoul (KR)

(72) Inventors: Jae Sik Seo, Hwaseong-si (KR); Chan Ul Jeong, Seoul (KR); Hyun Jung Kim, Hwaseong-si (KR); Ho Tak Jeon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/912,185

(22) Filed: Jun. 25, 2020

(65) Prior Publication Data
US 2021/0041618 A1    Feb. 11, 2021

(30) Foreign Application Priority Data

Aug. 8, 2019    (KR) .......................... 10-2019-0096769

(51) Int. Cl.
*F21V 8/00*      (2006.01)
*G02B 6/12*      (2006.01)
*B60R 13/04*     (2006.01)

(52) U.S. Cl.
CPC ............ *G02B 6/0031* (2013.01); *B60R 13/04* (2013.01); *G02B 6/12002* (2013.01); *B60K 2370/1531* (2019.05)

(58) Field of Classification Search
CPC .... G02B 6/0031; G02B 6/12002; B60R 13/04

USPC ......................................................... 362/609
See application file for complete search history.

(56) References Cited

U.S. PATENT DOCUMENTS

| 9,434,294 | B2* | 9/2016 | Salter | B60R 13/005 |
| 9,434,297 | B2* | 9/2016 | Salter | G09F 13/22 |
| 9,452,708 | B2* | 9/2016 | Salter | B60R 13/005 |
| 9,487,127 | B2* | 11/2016 | Salter | B60Q 1/323 |
| 9,607,534 | B2* | 3/2017 | Dellock | B60R 13/005 |
| 9,616,823 | B1* | 4/2017 | Salter | B60R 13/005 |
| 10,081,295 | B2* | 9/2018 | Dellock | G09F 13/22 |
| 10,520,159 | B1* | 12/2019 | Tsai | F21S 43/14 |
| 2004/0070965 | A1* | 4/2004 | Lin | G02B 6/0071 362/604 |
| 2009/0097260 | A1* | 4/2009 | Dielen | F21V 11/08 362/317 |

(Continued)

FOREIGN PATENT DOCUMENTS

KR    20-0370245 Y1    6/2014

*Primary Examiner* — Bryon T Gyllstrom
(74) *Attorney, Agent, or Firm* — McDonnell Boehnen Hulbert & Berghoff LLP

(57) ABSTRACT

Disclosed is a panel for vehicles enabling a three-dimensional pattern to emit light including a panel body having a three-dimensional pattern portion having an engraved three-dimensional pattern on a rear surface thereof, a coating portion provided on an upper surface of the three-dimensional pattern portion, and a lighting portion disposed inside of the panel body configured to emit light to the panel body. The lighting portion includes a light guide plate provided at a position corresponding to the panel body, a light source provided on a side of the light guide plate, and a reflective sheet provided on an inner side of the light guide plate.

13 Claims, 15 Drawing Sheets

(56) References Cited

U.S. PATENT DOCUMENTS

2012/0280528 A1* 11/2012 Dellock .................. B60Q 1/32
                                                    296/1.08
2013/0335994 A1* 12/2013 Mulder .................... F21V 9/00
                                                    362/555
2017/0355302 A1* 12/2017 Kuramitsu ............... B60Q 1/50

* cited by examiner

FIG. 3

| Raw material | based on the feature whereby thickness of coating portion is set at 21 to 22 μm (100%) while fixing pigment contained in coating portion (pigment contained in coat) at 5% by weight | | | | | | |
|---|---|---|---|---|---|---|---|
| | 0% | 10% (Thickness of coating portion 2~3μ) | 30% (Thickness of coating portion 6~7μ) | 50% (Thickness of coating portion 10~11μ) | 70% (Thickness of coating portion 14~15μ) | 90% (Thickness of coating portion 18~19μ) | 100% (Thickness of coating portion 21~22μ) |
| Three-dimensional portion (0% by weight of pigment containing carbon black) | Comparative Example 2-1-1 | Comparative Example 2-1-2 | Comparative Example 2-1-3 | Comparative Example 2-1-4 | Comparative Example 2-1-5 | Comparative Example 2-1-6 | Comparative Example 2-1-7 |
| Three-dimensional portion (0.003% by weight of pigment containing carbon black) | Comparative Example 3-1-1 | Comparative Example 3-1-2 | Comparative Example 3-1-3 | Comparative Example 3-1-4 | Comparative Example 3-1-5 | Comparative Example 3-1-6 | Comparative Example 3-1-7 |
| Three-dimensional portion (0.006% by weight of pigment containing carbon black) | Comparative Example 1-1-1 | Comparative Example 1-1-2 | Comparative Example 1-1-1 | Comparative Example 1-1-2 | Comparative Example 1-1-3 | Comparative Example 1-1-3 | Comparative Example 1-1-4 |
| Three-dimensional portion (0.009% by weight of pigment containing carbon black) | Comparative Example 4-1-1 | Comparative Example 4-1-2 | Comparative Example 4-1-3 | Comparative Example 4-1-4 | Comparative Example 4-1-5 | Comparative Example 4-1-6 | Comparative Example 4-1-7 |

VEHICLE PANEL FOR EMITTING STEREOSCOPIC PATTERN

CROSS REFERENCE TO RELATED APPLICATIONS

This application claims, under 35 U.S.C. § 119(a), the benefit of priority to Korean Patent Application No. 10-2019-0096769, filed on Aug. 8, 2019, the entire contents of which are incorporated herein by reference.

BACKGROUND

(a) Technical Field

The present disclosure relates to a vehicle panel for emitting a stereoscopic (three-dimensional) pattern.

(b) Background Art

Recently, interior mood lamps in vehicles have come to be widely applied due to the high quality thereof. In the past, linear forms of lighting have been popular and applied worldwide, and research has been conducted on light emitters having linear structures such as light guides and light strings for the application thereof. Recently, surface-lighting decorative parts using films have been industrially mass-produced, mainly in Europe, and when producing IML- and IMD-type films, selective shielding structures are formed by changing the color profiles between the film layers and design patterns are implemented based on such light-transmission and light-shielding effects. However, since IML films are considerably more expensive than coats in consideration of surface treatment, surface (plane)-light-emission lighting parts are being mass-produced using coating and laser cutting. However, in this case, laser processing is conducted on the surface, deteriorating quality due to the step, and when back coating and laser cutting are conducted, the surface should be reversed, resulting in problems of a high defect rate and thus poor mass-productivity.

Meanwhile, the recent design trend is toward establishing a unique identity using light, and parts that have been mass-produced to date according to this trend are mostly limited to line- or plane-type two-dimensional products. In addition, there is only a difference between an open type and a hidden type, and the realization of a desired design is determined only based on whether or not it is possible to emit light in a pattern.

In addition, both luxury and general car brands have recently recognized interior lighting as a design and are now mass-producing lighting parts. With the rapid growth of the electric car market, how designers express the difference from the interior of conventional internal combustion engines is emerging as a global concern, but most designers are trying to find a solution based on lighting parts.

Thus, there is the need for the development of panels for vehicles that can improve the problems of conventional manufacturing methods and overcome the limitations of conventional simple linear lighting.

The above information disclosed in this Background section is provided only for enhancement of understanding of the Background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide a vehicle panel including a panel body including an engraved three-dimensional pattern and a lighting portion for selectively transmitting light to emit the three-dimensional pattern.

The objects of the present disclosure are not limited to that described above. The objects of the present disclosure will be clearly understood from the following description and can be implemented by the means defined in the claims and combinations thereof.

In one aspect, the present disclosure provides a vehicle panel including a panel body including a three-dimensional pattern portion having an engraved three-dimensional pattern on a rear surface thereof, a coating portion provided on an upper surface of the three-dimensional pattern portion, and a lighting portion disposed at an inside of the panel body to emit light to the panel body, wherein the lighting portion includes a light guide plate provided at a position corresponding to the panel body, a light source provided on a side of the light guide plate, and a reflective sheet provided on an inner side of the light guide plate.

The vehicle panel may further include a light leakage prevention case disposed on a side of the light guide plate and provided adjacent to the light source to block external emission of light.

The three-dimensional pattern portion may have a three-dimensional pattern engraved to a depth of 0.2 mm to 1 mm.

The three-dimensional pattern may include a plurality of cells recessed perpendicularly or obliquely toward an upper surface from a rear surface thereof, wherein each cell has a side surface recessed perpendicularly or obliquely and a bottom surface having a predetermined shape partitioned by the side surface.

The bottom surface may have a shape selected from the group consisting of square, diamond, hemispherical, circular and oval shapes and a combination thereof.

The three-dimensional pattern may include one selected from the group consisting of polycarbonate (PC), polymethyl methacrylate (PMMA), polycarbonate/polyethylene terephthalate, polycarbonate/polyethylene terephthalate glycol (PC/PETG), ABS (acrylonitrile butadiene styrene copolymer), PC/ABS composites and combinations thereof.

The polycarbonate may include one selected from the group consisting of a transparent polycarbonate, an opaque polycarbonate, and a combination thereof.

The opaque polycarbonate may include 99.991 to 99.9997% by weight of polycarbonate and 0.003 to 0.009% by weight of a pigment containing carbon black.

The coating portion may include a coat selected from the group consisting of an achromatic coat, a chromatic coat and a combination thereof, and a pigment.

The coating portion may include 95 to 99.5% by weight of the coat, and 0.5 to 5% by weight of the pigment.

The coating portion may have a thickness of 2 to 22 um.

The light guide plate may include, on the outer surface thereof, a light-transmissive portion having an area corresponding to an area of a cell of the three-dimensional pattern portion, and a shielding portion having an area corresponding to an area excluding the area of the cell of the three-dimensional pattern portion.

The shielding portion may be formed by adhering a printed film on the light guide plate, or printing a film on the light guide plate.

The film may include one selected from the group consisting of polycarbonate (PC), polymethyl methacrylate (PMMA), polyethylene terephthalate (PET) and combinations thereof.

Light may be incident upon the light guide plate from the light source, the incident light may be reflected by the reflective sheet, and the reflected light may pass through the light-transmissive portion of the light guide plate and may be emitted to the panel body to enable the three-dimensional pattern to emit light.

The light-emitting three-dimensional pattern may have a luminance of 0.5 to 6 cd/m², a transmittance of 1 to 30% and a brightness (L*) of 2 to 40.

A brightness of the light-emitting three-dimensional pattern may be controlled by controlling the brightness (L*).

The vehicle panel may be selected from the group consisting of a garnish for interior parts, a bumper garnish, a rear garnish, a tailgate garnish, a front garnish, a side garnish, a filler garnish, a fender garnish, a side-step garnish, a front door molding, a front rear molding, a bumper molding, a door scuff, a label and a combination thereof.

Other aspects and preferred embodiments of the disclosure are discussed infra.

BRIEF DESCRIPTION OF THE FIGURES

The above and other features of the present disclosure will now be described in detail with reference to certain exemplary embodiments thereof, illustrated in the accompanying drawings, which are given hereinbelow by way of illustration only, and thus are not limitative of the present disclosure, and wherein:

FIG. 3 is an image to determine whether or not the vehicle panels according to Examples 1-1-1 to 1-1-3, and the vehicle panels according to Comparative Examples 1-1-1 to 1-1-4, Comparative Examples 2-1-1 to 2-1-7, Comparative Examples 3-1-1 to 3-1-7, and Comparative Examples 4-1-1 to 4-1-7, can realize three-dimensional patterns during the day;

DETAILED DESCRIPTION

The objects described above, and other objects, features and advantages of the present disclosure, will be clearly understood from the following embodiments with reference to the attached drawings. However, the present disclosure is not limited to the embodiments, and may be embodied in different forms. The embodiments are suggested only to offer a thorough and complete understanding of the disclosed context and to sufficiently inform those skilled in the art of the technical concept of the present disclosure.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all numbers, figures and/or expressions. In addition, when numerical ranges are disclosed in the description, these ranges are continuous and include all numbers from the minimum to the maximum, both inclusive, within each range unless otherwise defined. Furthermore, when the range refers to an integer, it includes all integers from the minimum to the maximum, both inclusive, within the range, unless otherwise defined.

Figure 1:
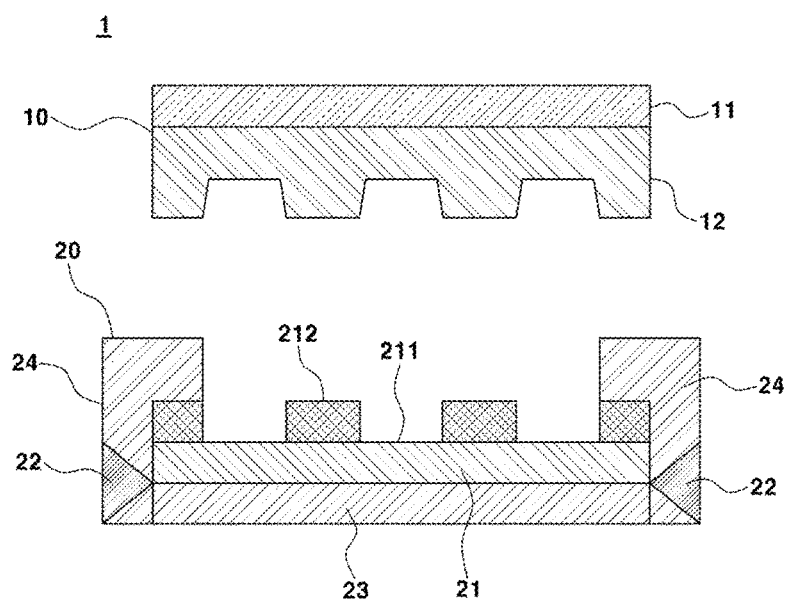
FIG. 1 is a sectional view schematically illustrating a vehicle panel according to the present disclosure.

FIG. 1 is a sectional view schematically showing a vehicle panel 1 according to the present disclosure. Referring to this, the vehicle panel includes a panel body 10 that is externally exposed and a lighting portion 20 disposed to emit light from an inner surface of the panel body.

Hereinafter, each element included in the vehicle panel will be described in detail.

Panel Body

The panel body according to an embodiment of the present disclosure is not particularly limited, as long as a three-dimensional pattern is hidden and thus difficult to identify with the naked eye during the day, but a three-dimensional pattern emitted when a light source is turned on at night can be identified with the naked eye while the expression of the edge of the three-dimensional pattern can be improved.

Three-Dimensional Pattern Portion

Figure 2:
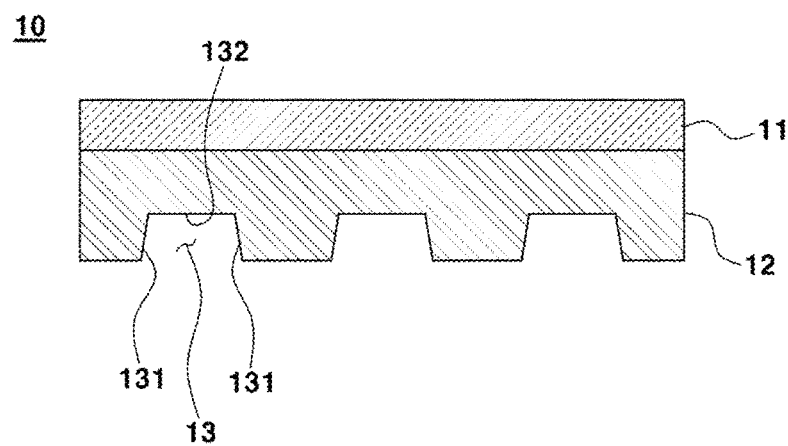
FIG. 2 is a sectional view schematically illustrating a panel body included in the vehicle panel according to the present disclosure.

FIG. 2 is a cross-sectional view schematically showing the panel body 10 of the vehicle panel 1 according to the present disclosure. Referring to this, the panel body 10 includes a three-dimensional pattern portion 11, having an engraved three-dimensional pattern on the rear surface thereof, and a coating portion 12, provided on the upper surface of the three-dimensional pattern portion.

A plurality of three-dimensional patterns may be engraved on the rear surface of the three-dimensional pattern portion 11 according to the present disclosure. The three-dimensional pattern portion 11 is not particularly limited, as long as it is easily concealed when light is not emitted from the light source, but can improve expression of the three-dimensional texture (feeling) when light is emitted from the light source.

The shape of the three-dimensional pattern according to the present disclosure is not particularly limited, as long as it has an aesthetic and luxurious three-dimensional appearance due to excellent expression of the edge of the three-dimensional pattern. Preferably, the three-dimensional pattern portion includes a plurality of cells 13 recessed perpendicularly or obliquely toward the upper surface from the rear surface thereof, wherein each cell 13 has a side surface 131 recessed perpendicularly or obliquely and a bottom surface 132 having a predetermined shape partitioned by the side surface. The side surface of the cell may include a side surface that is recessed perpendicularly or obliquely, but includes a constant, increasing or decreasing radius of curvature, and a bottom surface having a predetermined shape partitioned by the side surface. Accordingly, the shape of the bottom surface may include one selected from the group consisting of square, diamond, hemispherical, circular and oval shapes and a combination thereof The basic material of the three-dimensional pattern portion 11 according to the present disclosure is not particularly limited as long as it can transmit light owing to the light-transmission property thereof. Preferably, the basic material is a plastic that has good impact resistance while transmitting light, and more preferably, may include one selected from the group consisting of polycarbonate (PC), polymethyl methacrylate (PMMA), polycarbonate/polyethylene terephthalate, polycarbonate/polyethylene terephthalate glycol (PC/PETG), ABS (acrylonitrile butadiene styrene copolymer), PC/ABS composites and combinations thereof. Even more preferably, the basic material may be polycarbonate (PC), which has excellent light transmission and impact resistance and can be efficiently engraved.

The three-dimensional pattern portion 11 according to the present disclosure is a transparent three-dimensional pattern portion formed of a transparent material containing the base material, or an opaque three-dimensional pattern portion for increasing the three-dimensional texture of the shape of each three-dimensional pattern through addition of a pigment and a diffusion agent to the base material. For example, the three-dimensional pattern portion containing polycarbonate may be a three-dimensional pattern portion containing polycarbonate or a three-dimensional pattern portion containing an opaque polycarbonate added with a pigment and a diffusion agent. Preferably, it may be a three-dimensional pattern portion containing opaque polycarbonate that can secure a three-dimensional texture and luminescence brightness, while increasing the three-dimensional texture due to excellent expression of the pattern edge without reduction of concealability.

The opaque polycarbonate included in the three-dimensional pattern portion may be added with a diffusion agent, a pigment or the like, but preferably may be added only with a pigment, without a diffusion agent, in order to prevent the deterioration in the three-dimensional texture and reduction in the luminescent brightness and turbidity due to the diffusion effect. The pigment is not particularly limited as long as it can secure concealability and improve a three-dimensional texture, and may be, for example, silica, titanium dioxide, an azo-based compound or a phthalocyanine-based compound, and preferably a carbon-black-based pigment. As the content of the carbon black increases, the coating material of the coating portion, which will be described later, may be omitted.

Accordingly, the opaque polycarbonate according to the present disclosure may be composed of 99.991 to 99.9997% by weight of polycarbonate and 0.003 to 0.009% by weight of a pigment containing carbon black, and the pigment containing carbon black may be freely regulated depending on the amount of the pigment added to the coating portion, which will be described later. When the weight percentage of the polycarbonate is less than 99.991% by weight, the transmittance may decrease, and when the light is irradiated by the light source, the edge line of the pattern may be excessively exposed, leading to an increase in artificial unbalance. When the weight percentage of the polycarbonate exceeds 99.997% by weight, concealability may be deteriorated or the two-dimensional effect in the front may be degraded. In addition, when the weight percentage of the pigment containing carbon black is less than 0.003% by weight, the internal structure of the three-dimensional pattern portion may be projected even though light passes through the three-dimensional pattern portion, and when it exceeds 0.009% by weight, the lighting effect may be reduced, and thus the three-dimensional feeling may be deteriorated.

The engraving depth of the three-dimensional pattern according to the present disclosure is not particularly limited, as long as impact resistance is excellent, the three-dimensional textured sensation of the designed pattern is maintained, and the engraving depth may be varied in consideration of the three-dimensional feeling and impact resistance according to the basic material and three-dimensional shape. For example, the three-dimensional pattern of the three-dimensional pattern portion containing polycarbonate may be engraved to a depth of 0.2 mm to 1 mm. When the engraving depth is less than 0.2 mm, the three-dimensional feeling may be insufficient, and when the engraving depth exceeds 1 mm, the impact characteristics of the vehicle panel may be reduced.

The thickness of the three-dimensional pattern portion (the overall thickness of the substrate, not the depth of the pattern portion) according to the present disclosure is not particularly limited, as long as impact resistance is excellent and the three-dimensional feeling can be maintained. Preferably, the thickness may be 1.5 mm to 3 mm. When the thickness of the three-dimensional pattern portion is less than 1.5 mm, large-area parts such as garnishes cause problems in poor injection molding due to poor flow, and excessive surface sinkage of the applied pattern occurs. When the thickness of the three-dimensional pattern portion exceeds 3 mm, excessive shrinkage (contraction) results in the sinkage of the two-dimensional pattern portion, and thus appearance defects of the two-dimensional pattern portion, or it is difficult to apply as a lighting component due to considerably reduced transmittance and luminance.

(1) Coating Portion

The coating portion 12 according to the present disclosure is not particularly limited, as long as it is coated on the top of the three-dimensional pattern portion and can increase the concealability of the three-dimensional pattern portion including the three-dimensional pattern and enable the appearance of the coating portion to be identified when light is not incident thereon but does not reduce the three-dimensional texture of the three-dimensional pattern portion containing the three-dimensional pattern when light is incident thereon.

The coating portion according to the present disclosure may appear as an achromatic or chromatic color during the day, and may preferably include a coat selected from the group consisting of achromatic coats, chromatic coats and combinations thereof. For example, for achromatic coats, it may be a metallic coat, a general black matte coat, a high-elastic coat, a soft coat, a white pigment, or preferably a light-transmissive black high-gloss coat. For chromatic coats, it may be a general solid-color coat, a tinted coat or the like. Even more preferably, the light-transmissive black high-gloss coat may be a 2-coat type or a 1-coat type, and preferably, a clear 1-coat type. The high-gloss coat may be coated in a UV curing type or a thermal curing type. Accordingly, it can realize the appearance of a specific pattern, for example, wood, metallic, high gloss, etc., which is generated by the coating portion during the day.

In addition, the coating portion according to the present disclosure may be further added with a pigment in order to improve the concealment function and the light-transmitting function for the three-dimensional pattern included in the three-dimensional pattern portion. The pigment may be, for example, a nano-sized carbon black, preferably a composite of the nano-sized carbon black and an azo compound or a phthalocyanine-based compound.

Preferably, the coating portion may be composed of 95 to 99.5% by weight of the coat and 0.5 to 5% by weight of the pigment. When the weight percentage of the coat is less than 95% by weight or the weight percentage of the pigment is less than 0.5% by weight, there is a disadvantage in that concealability is lowered, and when the weight percentage of the coat exceeds 99.5% by weight or the weight percentage of the pigment exceeds 5% by weight, there is a disadvantage in that light transmittance is lowered.

In addition, the present disclosure can control the thickness of the coating portion to exhibit the same effect as that exhibited upon addition of 0.5 to 5% by weight of the pigment. Specifically, based on the feature whereby the thickness of the coating portion is set at 21 to 22 um (100%) while fixing the pigment contained in the coat at 5% by weight, the coating portion may be formed with a thickness of 18 to 19 μm (90%) in order to manufacture the coating portion containing 4.5% of the pigment, the coating portion may be formed with a thickness of 14 to 15 μm (70%) in order to manufacture the coating portion containing 3.5% of the pigment, the coating portion may be formed with a thickness of 10 to 11 μm (50%) in order to manufacture the coating portion containing 2.5% of the pigment, the coating portion may be formed with a thickness of 6 to 7 μm (30%) in order to manufacture the coating portion containing 1.5% of the pigment, and the coating portion may be formed with a thickness of 2 to 3 um (10%) in order to manufacture the coating portion containing 0.5% of the pigment. Therefore, the weight percentage of the pigment may be adjusted by controlling the thickness of the coating portion instead of controlling the weight percentage of the pigment contained in the coat.

Lighting Portion

FIG. 1 is a cross-sectional view schematically showing the lighting portion 20 of the vehicle panel 1 according to the present disclosure. Referring to FIG. 1, the lighting portion disposed to emit light from the inner surface of the panel body may include a light guide plate 21 provided at a position corresponding to the panel body, a light source 22 provided on the side of the light guide plate 21, and a reflective sheet 23 provided on the inner side of the light guide plate 21, and may further include a light leakage prevention case 24 disposed at the side of the light guide plate and provided adjacent to the light source to block the external emission of light.

(1) Light Guide Plate

The light guide plate 21 according to the present disclosure is not particularly limited, as long as it can selectively emit light corresponding to the three-dimensional pattern included in the three-dimensional pattern portion of the panel body.

The light guide plate according to the present disclosure may include a light-transmissive portion 211 and a shielding portion 212, on the outer surface facing the three-dimensional pattern portion, and the reflective sheet 23 on the inner surface opposite the three-dimensional pattern portion. Preferably, the light-transmissive portion and the shielding portion may include, on the outer surface thereof, a light-transmissive portion having an area corresponding to the area of the cell of the three-dimensional pattern portion and a shielding portion having an area corresponding to the remaining area after excluding the area of the cell of the three-dimensional pattern portion.

The area of the cell of the three-dimensional pattern portion according to the present disclosure may be an area of the cell corresponding to the rear end of the three-dimensional pattern portion, an area of the cell corresponding to the middle of the recess toward the upper surface from the rear surface of the three-dimensional pattern portion, or an area of the cell (the same as the area of the bottom surface 132) that is recessed and corresponds to the engraving end toward the upper surface from the rear surface of the three-dimensional pattern portion, and may preferably be an area of the cell corresponding to the rear end of the three-dimensional pattern portion.

In addition, the shielding portion according to the present disclosure may be formed by adhering a film prepared by printing a black ink on a transparent film on the light guide plate, or may be formed by directly printing the black ink on a transparent light guide plate. The film may include one selected from the group consisting of polycarbonate (PC), polymethyl methacrylate (PMMA), polyethylene terephthalate (PET) and combinations thereof. In addition, the light guide plate may include a material selected from the group consisting of polycarbonate (PC), polymethyl methacrylate (PMMA) and combinations thereof. The printing may be carried out by printing the black ink on the light guide plate through a conventional technique that can be used by those skilled in the art to manufacture the present disclosure or a combination thereof with other printing techniques such as hydrostatic transfer, pad printing and the like.

Accordingly, the vehicle panel including the light guide plate according to the present disclosure can efficiently emit light to the three-dimensional pattern by selectively transmitting light only through the light-transmissive portion, excluding the shielding portion, when the light source is turned on, thereby reducing the costs incurred for conventional surface coating and laser cutting and solving the problems of poor quality due to the step resulting from the removal of the conventional surface coating layer and deteriorated mass-productivity due to the high defect rate resulting from laser cutting.

(2) Light Source

The light source 22 according to the present disclosure is not particularly limited as long as it is provided at the side of the light guide plate to emit light. The light source according to the present disclosure may be an LED that can emit light in various colors (red/blue/white or the like), and may be provided to be turned on at the same time as headlights or taillights, which are usually turned on at night. Preferably, the circuit may be configured such that the light source can receive vehicle power when the driver operates a multi-function switch to turn on the headlights or taillights.

(3) Reflective Sheet

The reflective sheet 23 according to the present disclosure is not particularly limited as long as it is provided inside the light guide plate to reflect light emitted to the light guide plate to thereby improve the light emission performance of the light guide plate. The material of the reflective sheet according to the present disclosure may include a sheet that is subjected to surface treatment to improve reflection efficiency, such as aluminum deposition, gloss plating or white coating, and preferably may be PET.

(4) Light Leakage Prevention Case

The light leakage prevention case 24 according to the present disclosure is not particularly limited, as long as it is disposed at the side of the light guide plate, is provided adjacent to the light source, and is capable of blocking the external emission of light. Preferably, the light leakage prevention case 24 may surround the side of the light guide plate of the shielding portion, disposed at both ends of the light guide plate so as to block light leakage, the light source adjacent thereto, and the side of the reflective sheet.

Vehicle Panel

In the vehicle panel according to the present disclosure, the light of the light source included in the lighting portion is incident upon the light guide plate, the incident light is reflected by the reflective sheet, and the reflected light passes through the light-transmissive portion of the light guide plate and is emitted to the panel body to enable the three-dimensional pattern to emit light.

In particular, the vehicle panel including the panel body and the lighting portion according to an embodiment of the present disclosure may have a transmittance of 2 to 10% and a brightness (L*) of 2 to 3 during the day, and thus may not realize the three-dimensional pattern. However, the three-dimensional pattern emitting light at night may have a luminance of 0.5 to 6 cd/m$^2$, a transmittance of 1 to 30% and a brightness (L*) of 2 to 40, and preferably a luminance of 1 to 3 cd/m$^2$, a transmittance of 3 to 10%, and a brightness (L*) of 3 to 10.

Figure 7A:
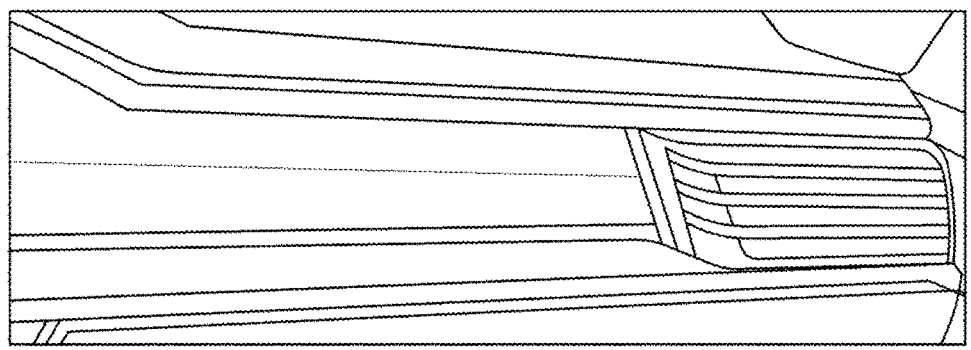
FIG. 7A is an image showing the appearance of the vehicle panel according to the present disclosure during the day.
Figure 7B:
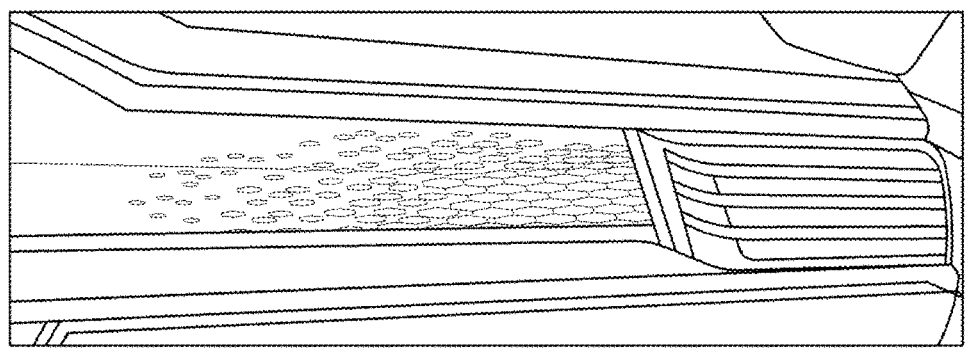
FIG. 7B shows the appearance of a three-dimensional pattern of the vehicle panel according to the disclosure when the light source is turned on at night.

That is, the vehicle panel according to the present disclosure is a hidden type, and the three-dimensional pattern is concealed during the day, so that it is difficult to identify with the naked eye. Instead, a specific pattern such as high gloss of the coating portion can be identified, the three-dimensional pattern, which is emitted when the light source is turned on at night, can be identified with the naked eye, and the expression of the edge of the three-dimensional pattern is excellent. Also, the brightness of the light-emitting three-dimensional pattern can be controlled through control of the brightness level, as shown in FIG. 7B, whereby a gradation effect can be added, and thus aesthetics and a sense of luxuriousness can be improved.

Accordingly, the vehicle panel according to the present disclosure may be selected from the group consisting of a garnish for interior parts, a bumper garnish, a rear garnish, a tailgate garnish, a front garnish, a side garnish, a filler garnish, a fender garnish, a side-step garnish, a front door molding, a front rear molding, a bumper molding, a door scuff, a. label and a combination thereof Hereinafter, one embodiment of the present disclosure will be described in more detail with reference to examples. However, the following examples are provided only for better understanding of the present disclosure and should not be construed as limiting the scope of the present disclosure.

EXAMPLE 1-1-1

(Three-Dimensional Pattern Portion)

Polycarbonate (PC) as a base material and a pigment containing carbon black were mixed using a twin screw extruder to prepare opaque carbonate containing 99.994% by weight of the polycarbonate and 0.006% by weight of the pigment containing carbon black. At this time, the three-dimensional pattern portion had a thickness of 3.0 mm and the shape of the three-dimensional pattern included in the three-dimensional pattern portion included a plurality of cells each having a diamond-shaped bottom surface, wherein the three-dimensional pattern was engraved to a depth of 0.4 to 0.8 mm.

(Coating Portion)

Carbon black, an azo compound and a phthalocyanine compound, serving as pigments, were mixed with a light-transmissive black high-gloss coat, as an achromatic coat, to produce a coating portion, and the produced coating portion was coated on the upper surface of the three-dimensional pattern portion by UV curing. Specifically, when the thickness of the coating portion was set at 21 to 22 µm (100%) while fixing the pigment contained in the coat at 5% by weight, the light-transmissive high-gloss coat was mixed with a pigment mixture of the carbon black, the azo compound and the phthalocyanine compound, and a coating portion was produced to a thickness of 6 to 7 µm (30%) to obtain the coating portion containing 1.5% of the pigment.

(Light Guide Plate)

The light guide plate was produced using PC as a base material, and in order to manufacture a shielding portion outside the light guide plate, a film prepared by coating, with a black ink, an area corresponding to the non-engraved area of the rear surface of the three-dimensional pattern portion was adhered to the light guide plate.

(Others)

A PET reflective sheet was provided inside the light guide plate, a 0.5W RGB-type LED was used as a light source, and an ABS injection-molded product was used as a light leakage prevention case to manufacture a vehicle panel.

EXAMPLES 1-1-2 AND 1-1-3

Vehicle panels were produced in the same manner as in Example 1, except that, when compared with Example 1, a coating portion containing 2.5% of a pigment was produced by adjusting the thickness of the coating portion to 10 to 11 um (50%) (Example 1-1-2), or a coating portion containing 3.5% of a pigment was produced by adjusting the thickness of the coating portion to 14 to 15 μm (70%) (Example 1-1-3).

EXAMPLES 1-2-1 TO 1-2-3

Vehicle panels were produced in the same manner as in Examples 1-2-1 to 1-2-3, except that, when compared with Examples 1-1-1 to 1-1-3, the thickness of the three-dimensional pattern portion was adjusted to 1.5 mm, instead of 3.0 mm.

COMPARATIVE EXAMPLES 1-1-1 TO 1-1-4

Vehicle panels were produced in the same manner as in Example 1-1-1, except that, when compared with Example 1-1-1, a coating portion containing no pigment was produced (Example 2-1-1), a coating portion containing 0.5% of a pigment was produced by adjusting the thickness of the coating portion to 2 to 3 um (10%) (Example 2-1-2), a coating portion containing 4.5% of a pigment was produced by adjusting the thickness of the coating portion to 18 to 19 μm (90%) (Example 2-1-3), or a coating portion containing 5.0% of a pigment was produced by adjusting the thickness of the coating portion to 21 to 22 μm (100%) (Example 2-1-4).

COMPARATIVE EXAMPLES 1-2-1 TO 1-2-4

Vehicle panels were produced in the same manner as in Examples 2-2-1 to 2-2-4, except that, when compared with Examples 2-1-1 to 2-1-4, the thickness of the three-dimensional pattern portion was adjusted to 1.5 mm, instead of 3.0 mm.

COMPARATIVE EXAMPLES 2-1-1 TO 2-1-7

Vehicle panels were produced in the same manner as in Example 1-1-1, except that, when compared with Example 1-1-1, using transparent polycarbonate containing no pigment, instead of the opaque polycarbonate contained in the three-dimensional pattern portion, a coating portion containing no pigment was produced (Comparative Example 2-1-1), a coating portion containing 0.5% of a pigment was produced by adjusting the thickness of the coating portion to 2 to 3 μm (10%) (Comparative Example 2-1-2), a coating portion containing 1.5% of a pigment was produced by adjusting the thickness of the coating portion to 6 to 7 μm (30%) (Comparative Example 2-1-3), a coating portion containing 2.5% of a pigment was produced by adjusting the thickness of the coating portion to 10 to 11 μm (50%) (Comparative Example 2-1-4), a coating portion containing 3.5% of a pigment was produced by adjusting the thickness of the coating portion to 14 to 15 μm (70%) (Example 2-1-5), a coating portion containing 4.5% of a pigment was produced by adjusting the thickness of the coating portion to 18 to 19 μm (90%) (Comparative Example 2-1-6), or a coating portion containing 5.0% of a pigment was produced by adjusting the thickness of the coating portion to 21 to 22 μm (100%) (Comparative Example 2-1-7).

COMPARATIVE EXAMPLES 2-2-1 TO 2-2-7

Vehicle panels were produced in the same manner as in Comparative Examples 2-2-1 to 2-2-7, except that, when compared with Comparative Examples 2-1-1 to 2-1-7, the thickness of the three-dimensional pattern portion was adjusted to 1.5 mm, instead of 3.0 mm.

COMPARATIVE EXAMPLES 3-1-1 TO 3-1-7

Vehicle panels were produced in the same manner as in Comparative Examples 2-1-1 to 2-1-7, except that, when compared with Comparative Examples 2-1-1 to 2-1-7, instead of the transparent polycarbonate contained in the three-dimensional pattern portion, an opaque carbonate consisting of 99.997% by weight of polycarbonate and 0.003% by weight of a pigment containing carbon black was used.

COMPARATIVE EXAMPLES 3-2-1 TO 3-2-7

Vehicle panels were produced in the same manner as in Comparative Examples 3-1-1 to 3-1-7, except that, when compared with Comparative Examples 3-1-1 to 3-1-7, the thickness of the three-dimensional pattern portion was adjusted to 1.5 mm, instead of 3.0 mm.

COMPARATIVE EXAMPLES 4-1-1 TO 4-1-7

Vehicle panels were produced in the same manner as in Comparative Examples 2-1-1 to 2-1-7, except that, when compared with Comparative Examples 2-1-1 to 2-1-7, instead of the transparent polycarbonate contained in the three-dimensional pattern portion, an opaque carbonate consisting of 99.991% by weight of polycarbonate and 0.009% by weight of a pigment containing carbon black was used.

COMPARATIVE EXAMPLES 4-2-1 TO 4-2-7

Vehicle panels were produced in the same manner as in Comparative Examples 4-1-1 to 4-1-7, except that, when compared with Comparative Examples 4-1-1 to 4-1-7, the thickness of the three-dimensional pattern portion was adjusted to 1.5 mm, instead of 3.0 mm.

EXPERIMENTAL EXAMPLE 1

Evaluation of Concealability of Vehicle Panel Depending on Pigment Contained in Three-Dimensional Pattern Portion and Pigment Contained in Coating Portion The concealability was compared between the vehicle panels according to Examples 1-1-1 to 1-1-3, and the vehicle panels according to Comparative Examples 1-1-1 to 1-1-4, Comparative Examples 2-1-1 to 2-1-7, Comparative Examples 3-1-1 to 3-1-7 and Comparative Examples 4-1-1 to 4-1-7, to determine the optimum pigment component range capable of sufficiently concealing the three-dimensional pattern during the day.

As a result, as shown in FIG. 3, in the vehicle panels according to Examples 1-1-1 to 1-1-3, the three-dimensional pattern included in the three-dimensional pattern portion during the day was not identifiable with the naked eye. On the other hand, in Comparative Examples 1-1-1 to 1-1-2, the three-dimensional pattern was partially identifiable. In Comparative Examples 1-1-3 to 1-1-4, wherein the pigment included in the coat exceeded 4.5% by weight (70%), there was no discrimination as in other Comparative Examples, and there was a problem in that the lighting effect was deteriorated in terms of the evaluation of the subsequent luminance, transmittance and brightness, so that the three-dimensional texture of the three-dimensional pattern was disadvantageously not clearly identifiable.

Figure 6A:
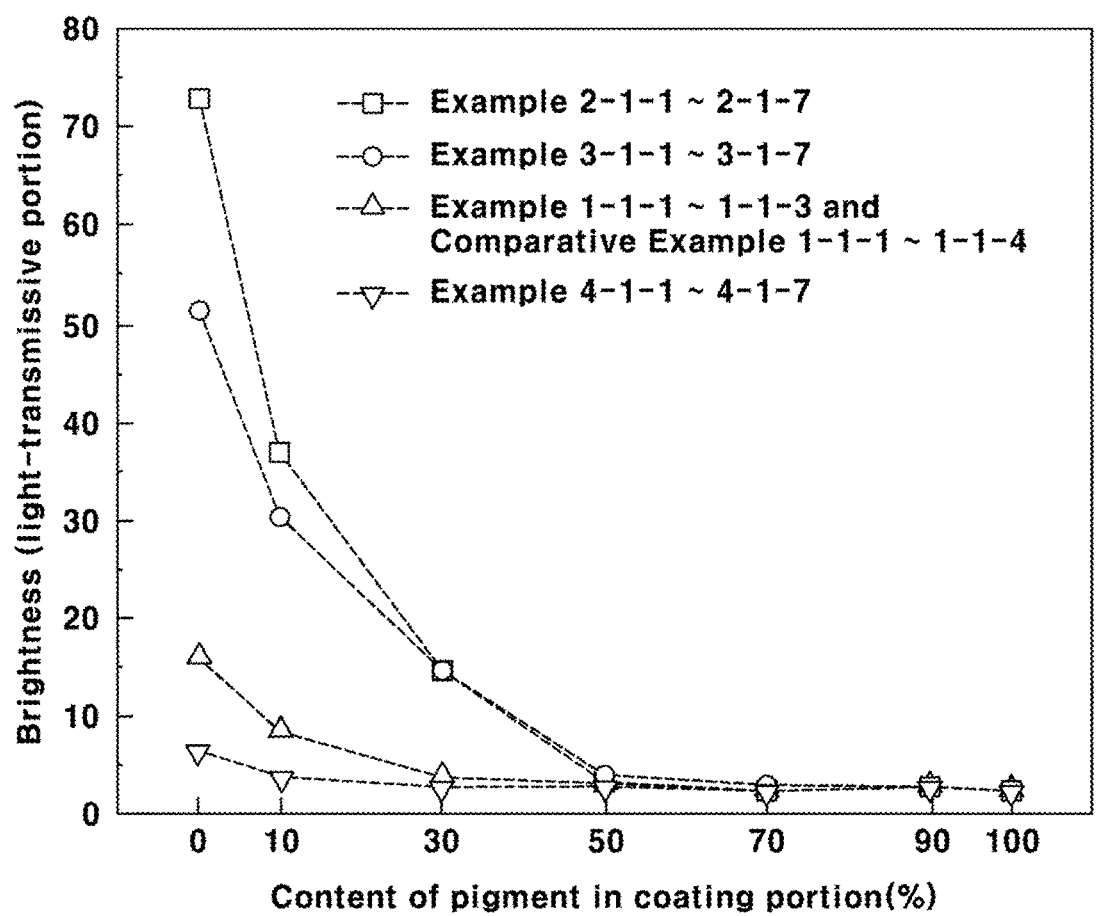
FIG. 6A is a graph showing the result of measuring the brightness (L*) of the three-dimensional patterns emitted from the vehicle panels according to Examples 1-1-1 to 1-1-3 and Comparative Examples 1-1-1 to 4-1-7.
Figure 6B:
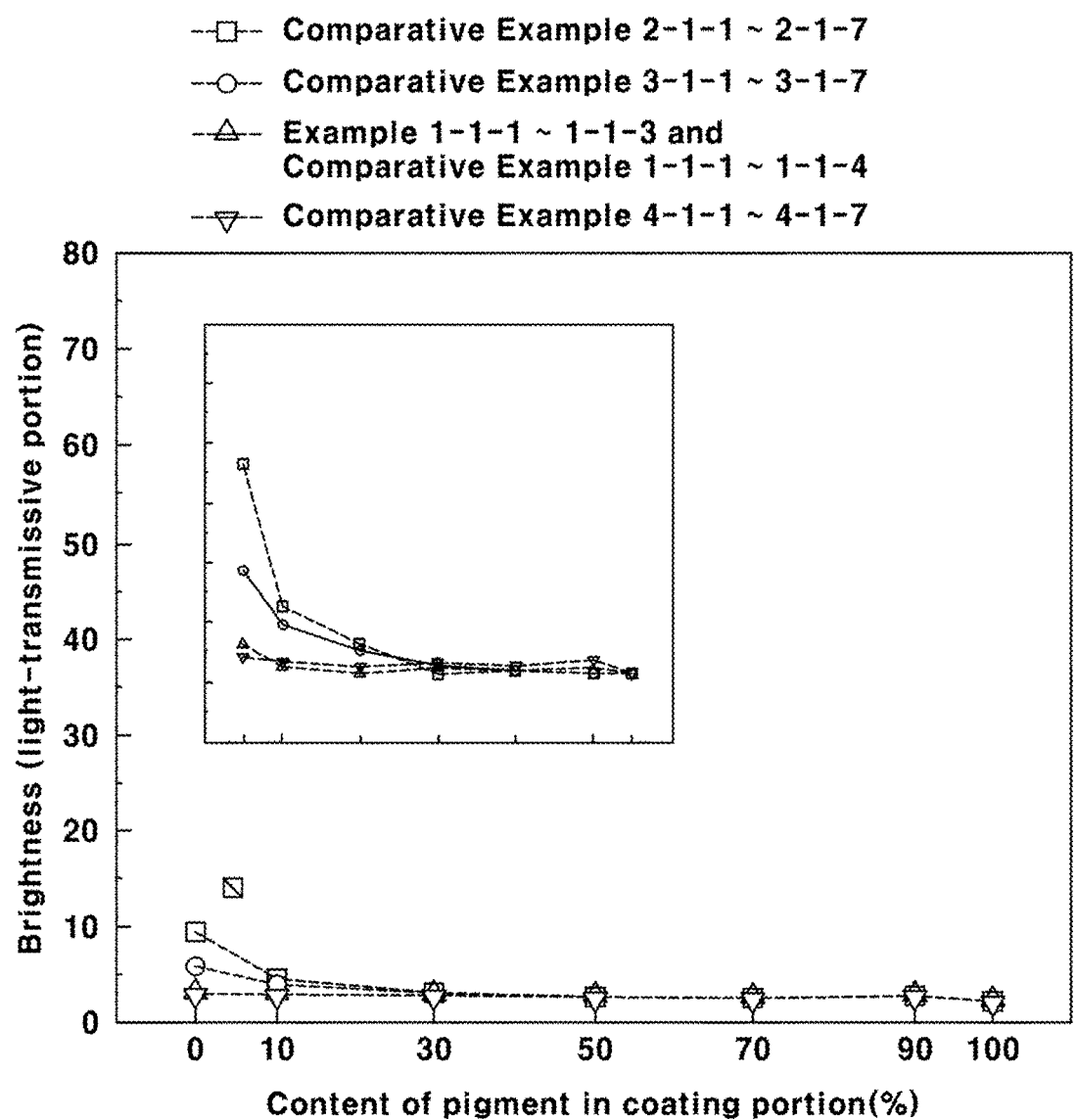
FIG. 6B is a graph showing the result of measuring the brightness (L*) of the three-dimensional patterns emitted from the vehicle panels according to Examples 1-1-1 to 1-1-3 and Comparative Examples 1-1-1 to 4-1-7.
Figure 6C:
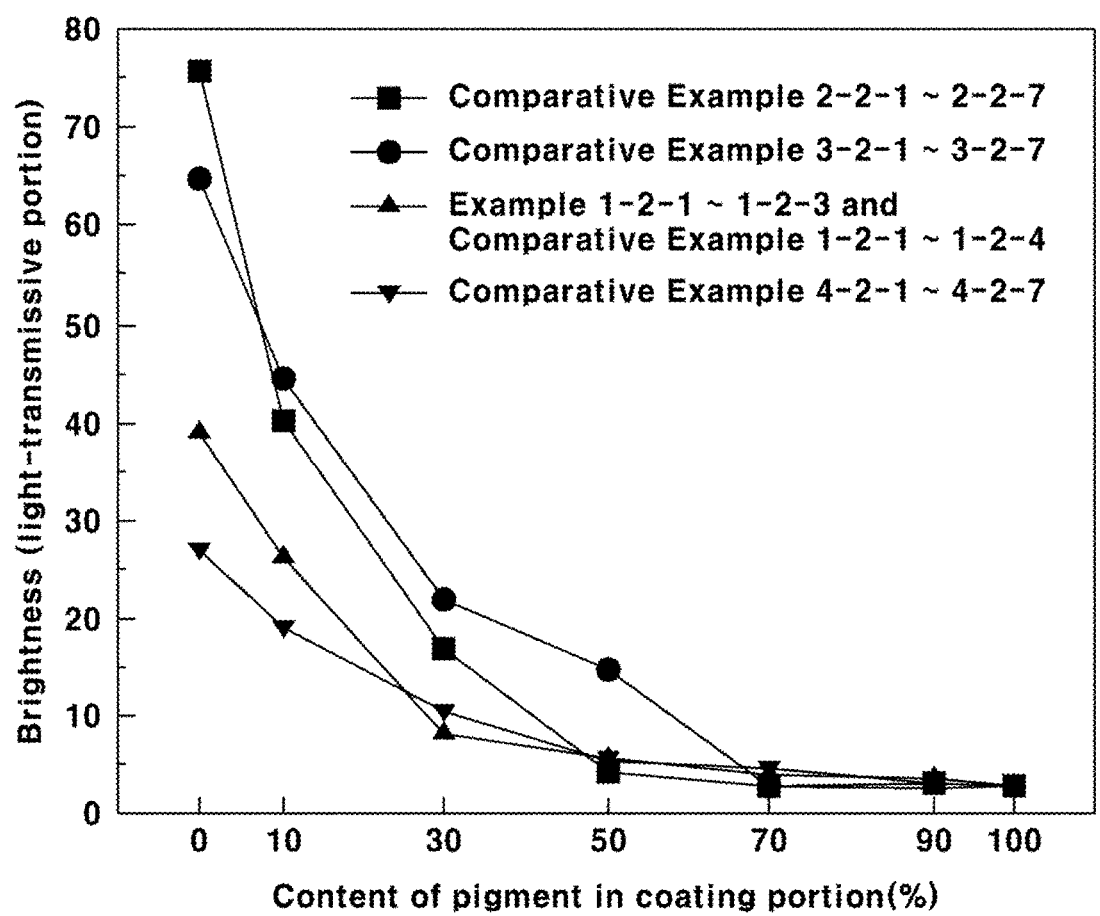
FIG. 6C is a graph showing the result of measuring the brightness (L*) of the three-dimensional patterns emitted from the vehicle panels according to Examples 1-2-1 to 1-2-3 and Comparative Examples 1-2-1 to 4-2-7.
Figure 6D:
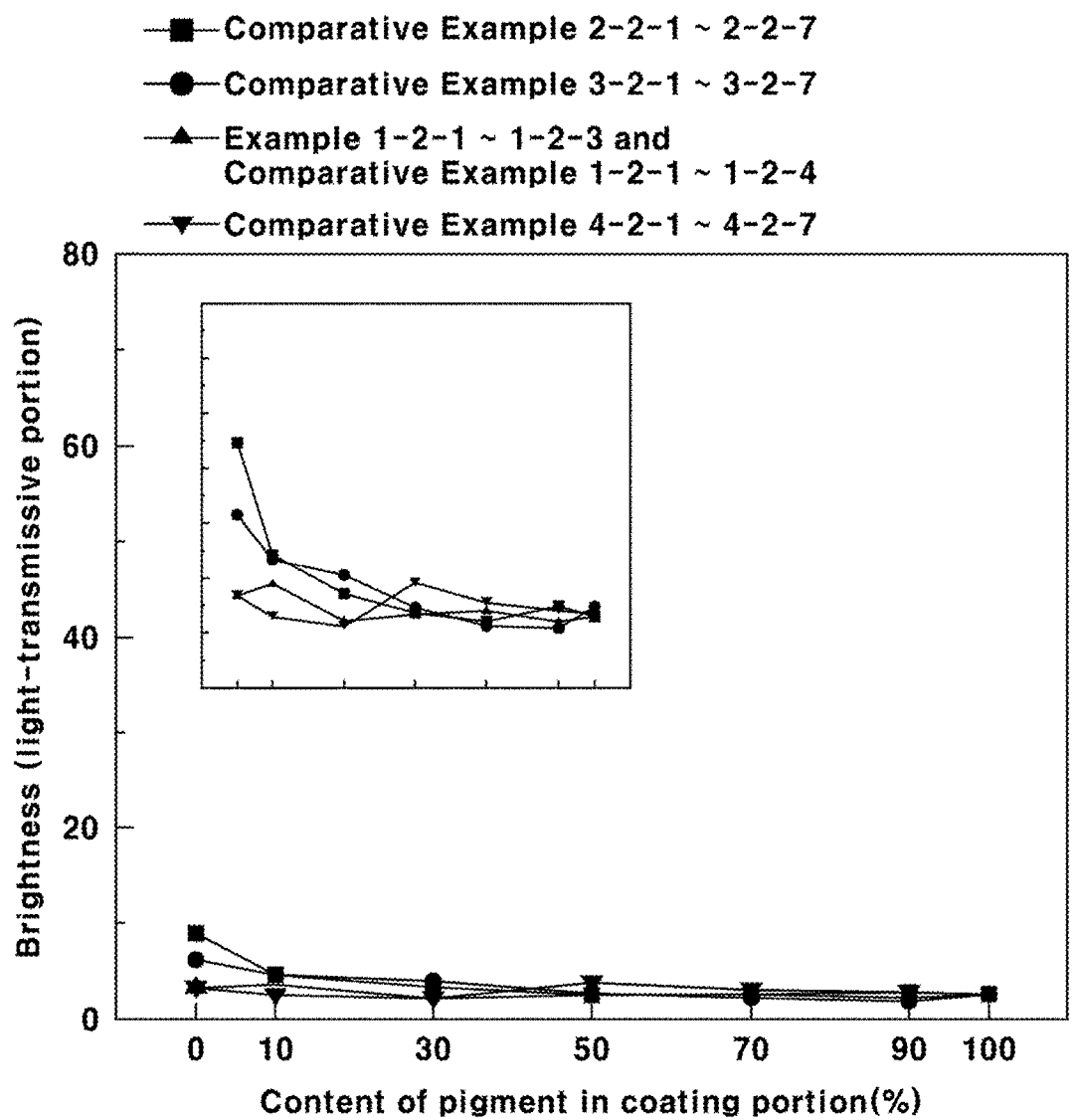
FIG. 6D is a graph showing the result of measuring the brightness (L*) of the three-dimensional patterns emitted from the vehicle panels according to Examples 1-2-1 to 1-2-3 and Comparative Examples 1-2-1 to 4-2-7.

Thus, in the vehicle panel according to the present disclosure, which includes a three-dimensional pattern portion containing an opaque carbonate consisting of 99.994% by weight of polycarbonate and 0.006% by weight of a pigment containing carbon black and a coating portion formed to a thickness of 6 to 15 μm (50%) such that it can include 1.5% to 3.5% of a pigment, as shown in FIG. 6A, during the day, the three-dimensional pattern was not identifiable with the naked eye, but a specific pattern such as high gloss represented by the coating portion could be identified, and it could be found that the three-dimensional feeling of the emitted three-dimensional pattern was excellent, even though the light source was turned on at night and light was irradiated.

EXPERIMENTAL EXAMPLE 2

Evaluation of luminance and transmittance of vehicle panel depending on pigment included in three-dimensional pattern portion and pigment included in coating portion The luminance and transmittance of the vehicle panels according to Examples 1-1-1 to 1-2-3 and the vehicle panels according to Comparative Examples 1-1-1 to 1-2-4, Comparative Examples 2-1-1 to 2-2-7, Comparative Examples 3-1-1 to 3-2-7 and Comparative Examples 4-1-1 to 4-2-7 were compared.

The reference luminance for evaluating the luminance and the transmittance was the luminance of the light-transmissive portion outside the light guide plate (reference luminance of 19.8 cd/m$^2$), and a luminance of at least 1 cd/m$^2$ is required to realize the light-emitting three-dimensional panel.

Figure 4A:
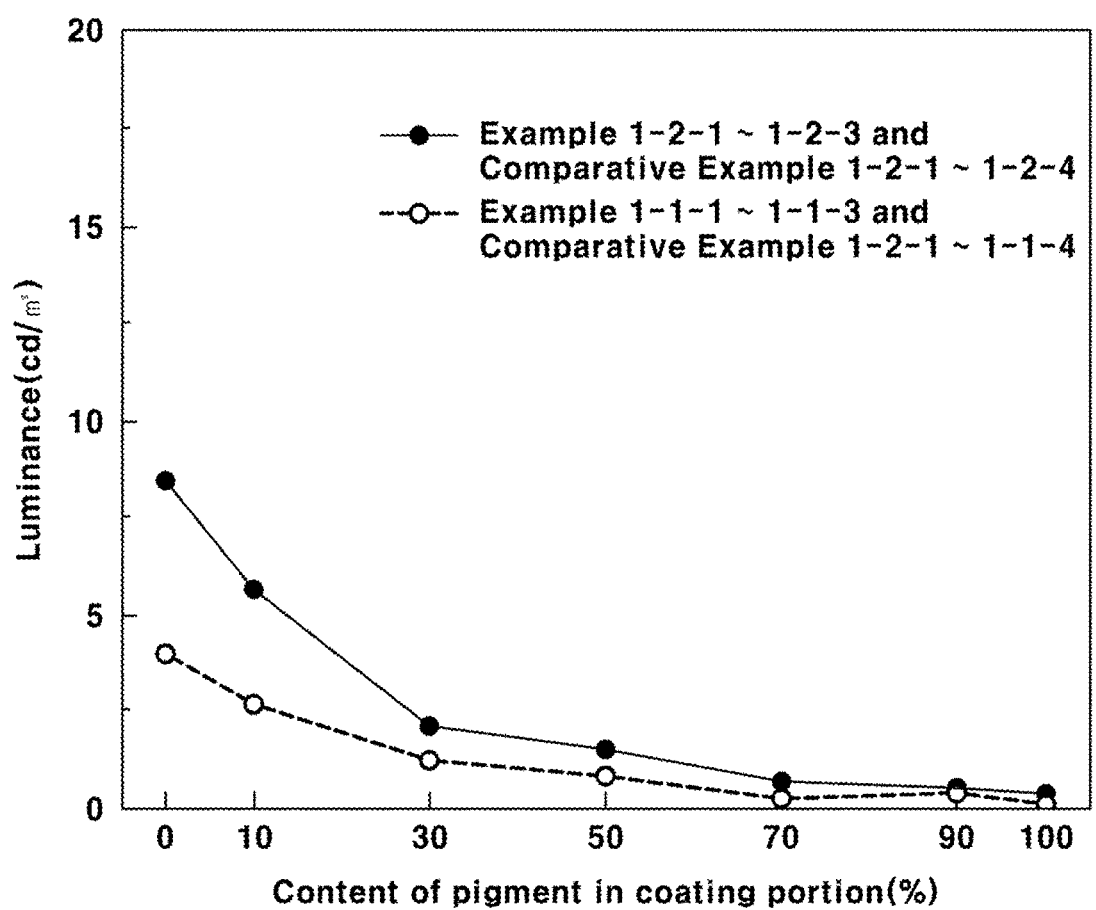
FIG. 4A is a graph showing the result of measuring the luminance of the three-dimensional patterns emitted from the vehicle panels according to Examples 1-1-1 to 1-1-3 and Comparative Examples 1-1-1 to 1-1-4.
Figure 4B:
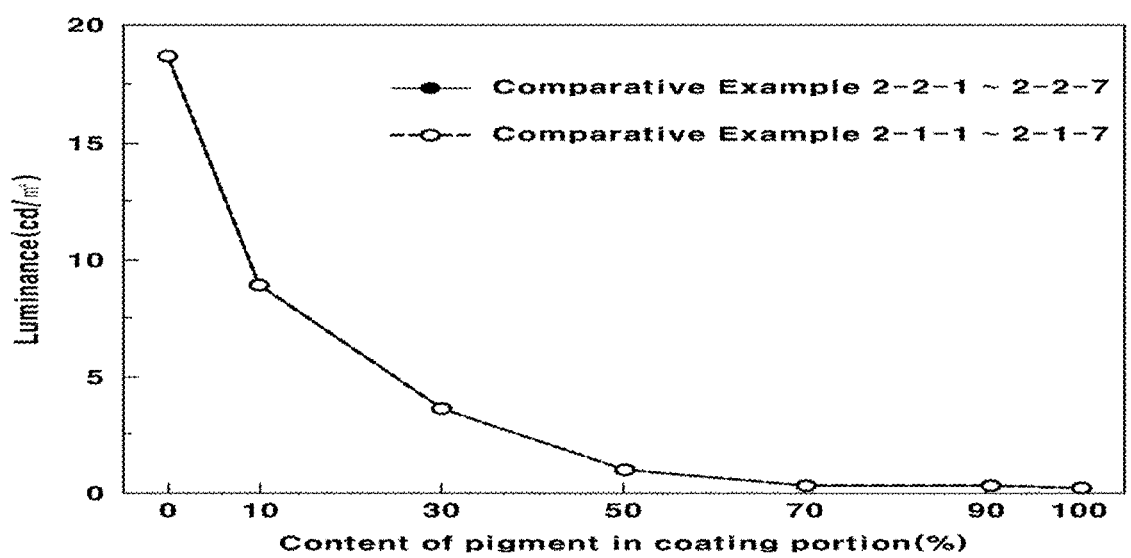
FIG. 4B is a graph showing the result of measuring the luminance of the three- dimensional patterns emitted from the vehicle panels according to Comparative Examples 2-1-1 to 2-1-7 and Comparative Examples 2-2-1 to 2-2-7.
Figure 4C:
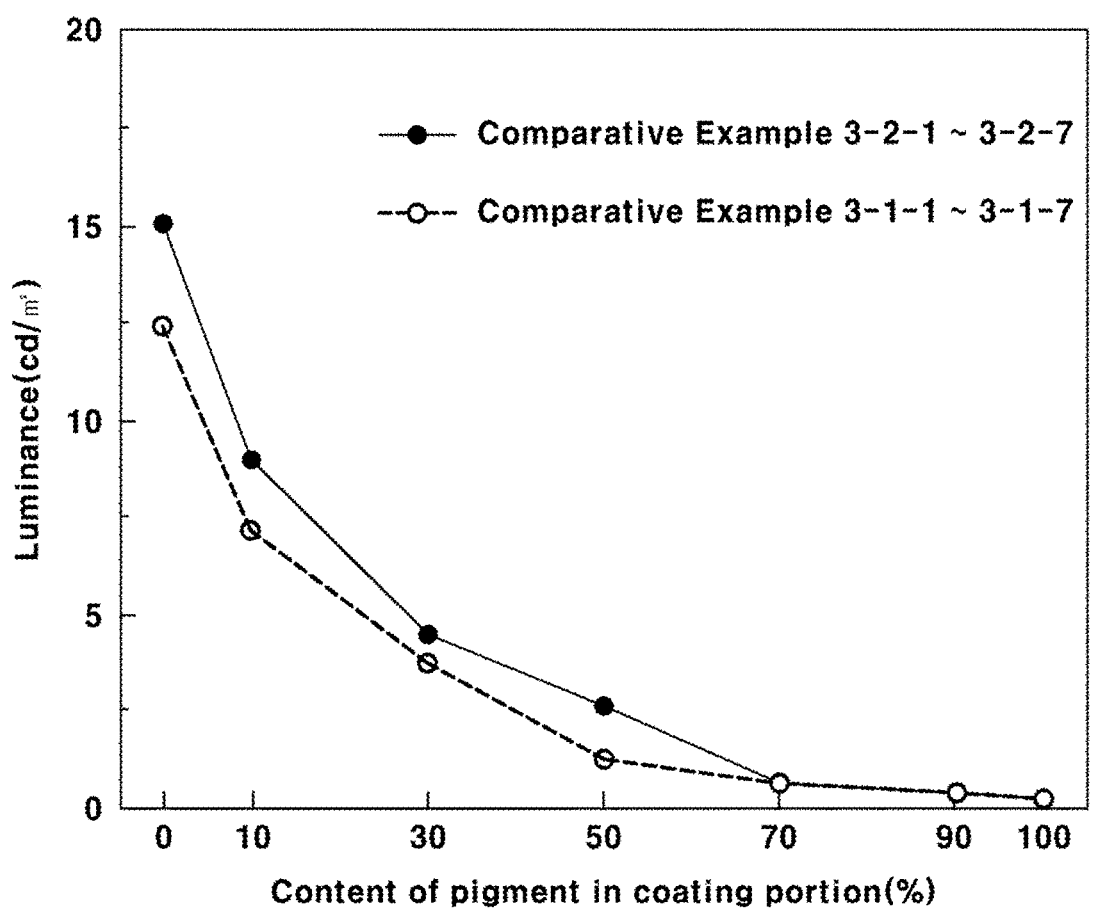
FIG. 4C is a graph showing the result of measuring the luminance of the three-dimensional patterns emitted from the vehicle panels according to Comparative Examples 3-1-1 to 3-1-7 and Comparative Examples 3-2-1 to 3-2-7.
Figure 4D:
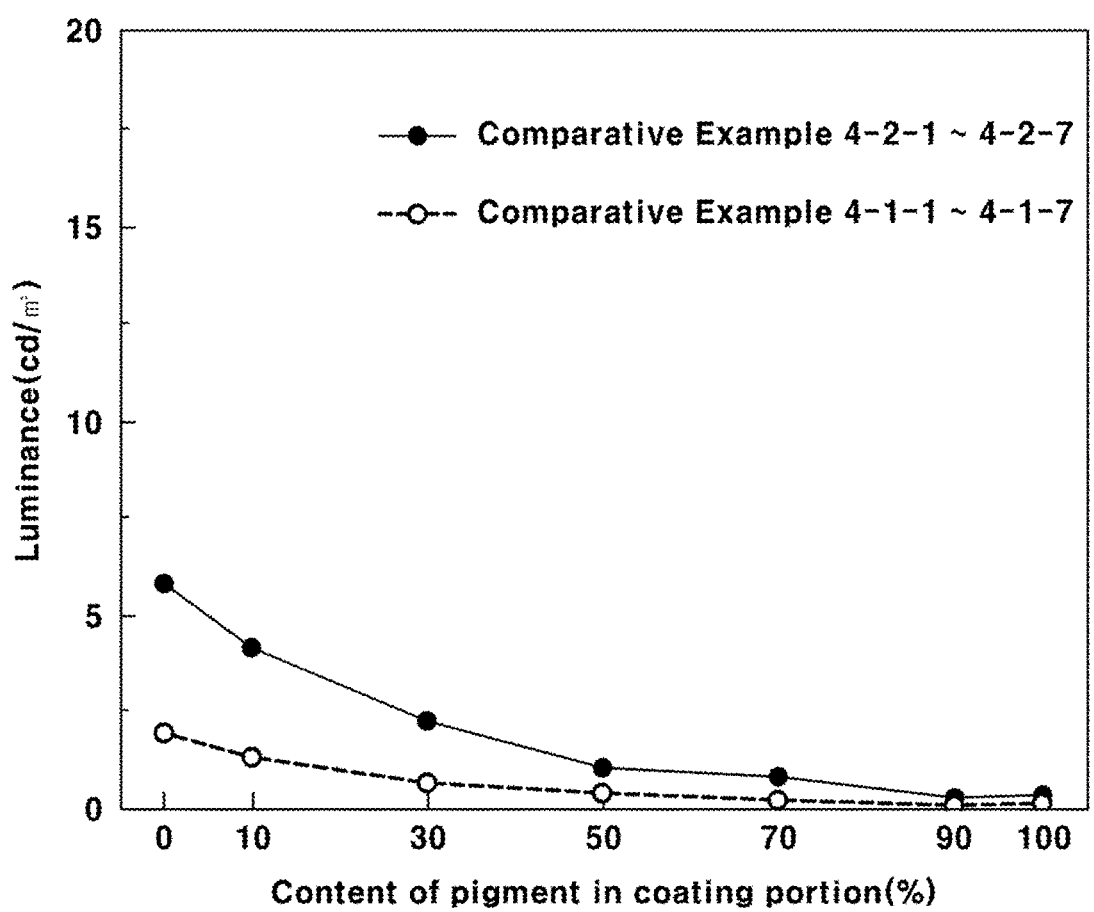
FIG. 4D is a graph showing the result of measuring the luminance of the three- dimensional patterns emitted from the vehicle panels according to Comparative Examples 4-1-1 to 4-1-7 and Comparative Examples 4-2-1 to 4-2-7.
Figure 5A:
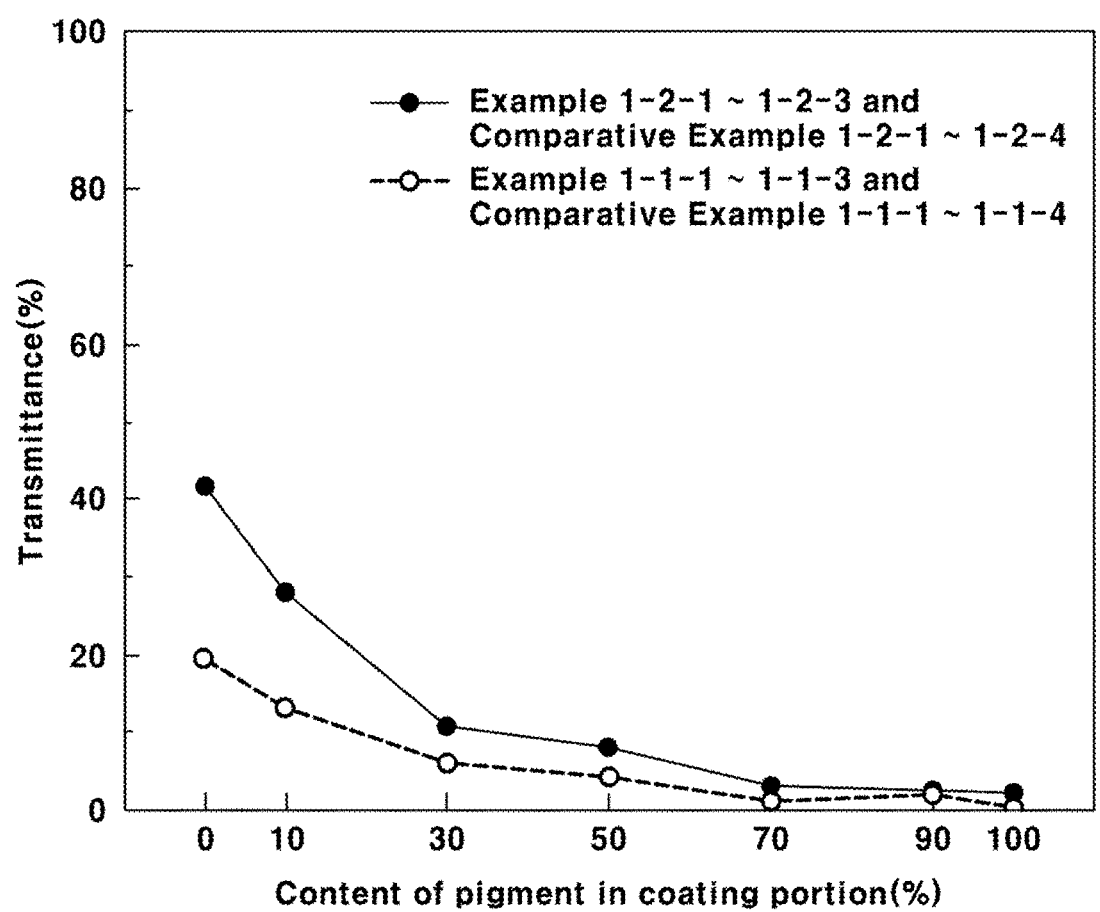
FIG. 5A is a graph showing the result of measuring the transmittance of the three-dimensional patterns emitted from the vehicle panels according to Examples 1-1-1 to 1-1-3 and Comparative Examples 1-1-1 to 1-1-4.
Figure 5B:
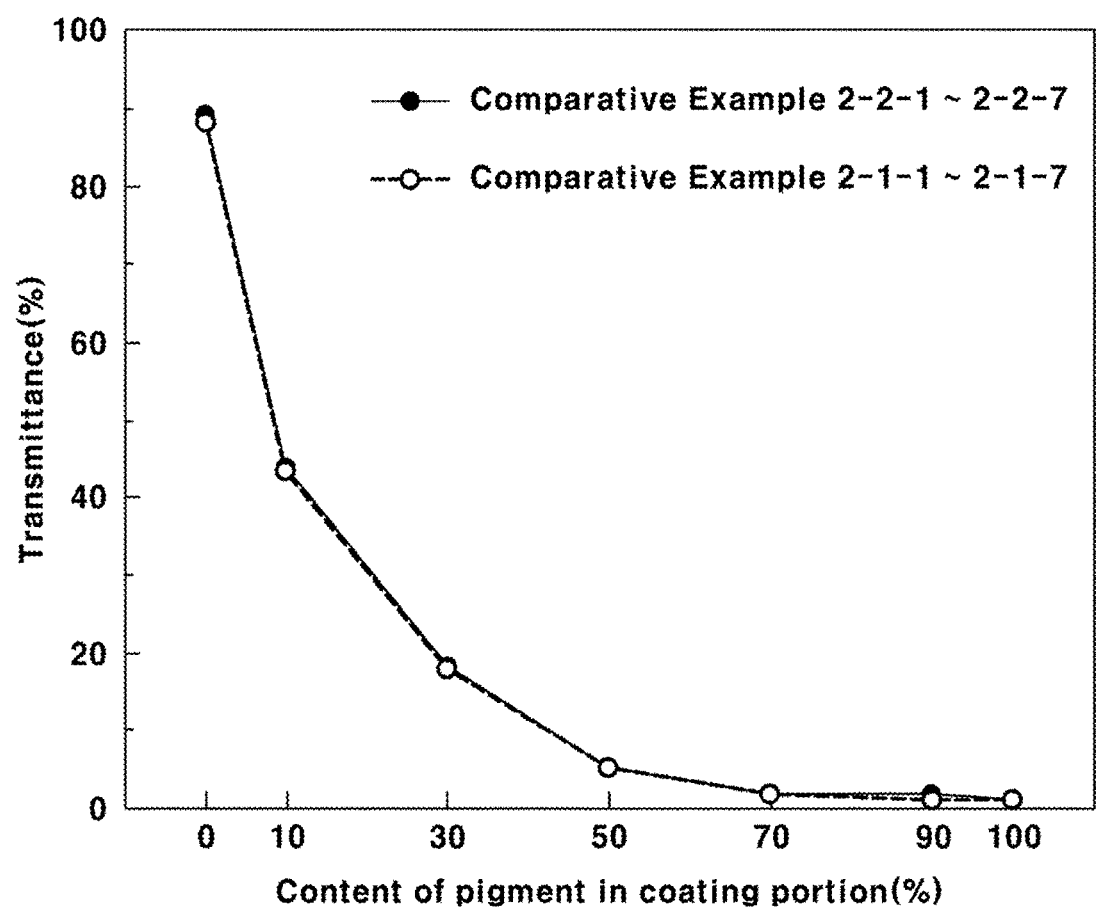
FIG. 5B is a graph showing the result of measuring the transmittance of the three-dimensional patterns emitted from the vehicle panels according to Comparative Examples 2-1-1 to 2-1-7 and Comparative Examples 2-2-1 to 2-2-7.
Figure 5C:
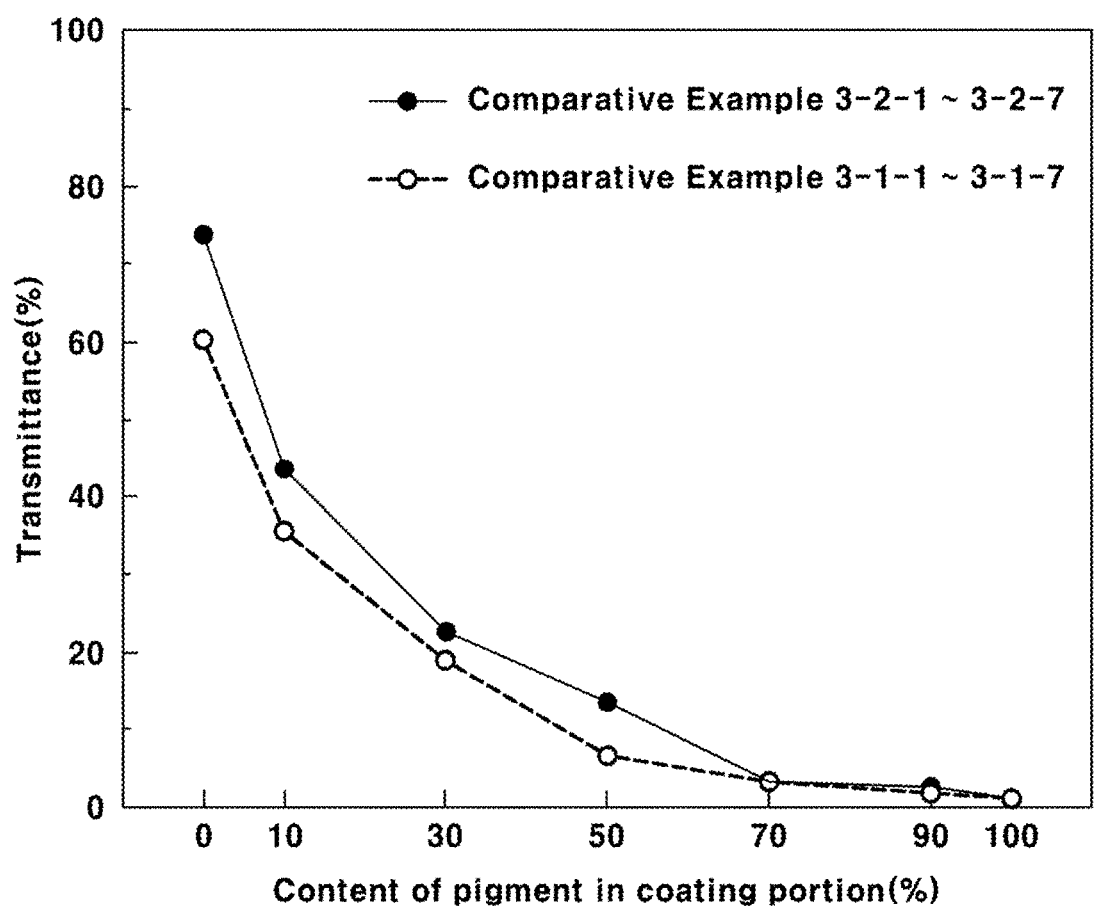
FIG. 5C is a graph showing the result of measuring the transmittance of the three-dimensional patterns emitted from the vehicle panels according to Comparative Examples 3-1-1 to 3-1-7 and Comparative Examples 3-2-1 to 3-2-7.
Figure 5D:
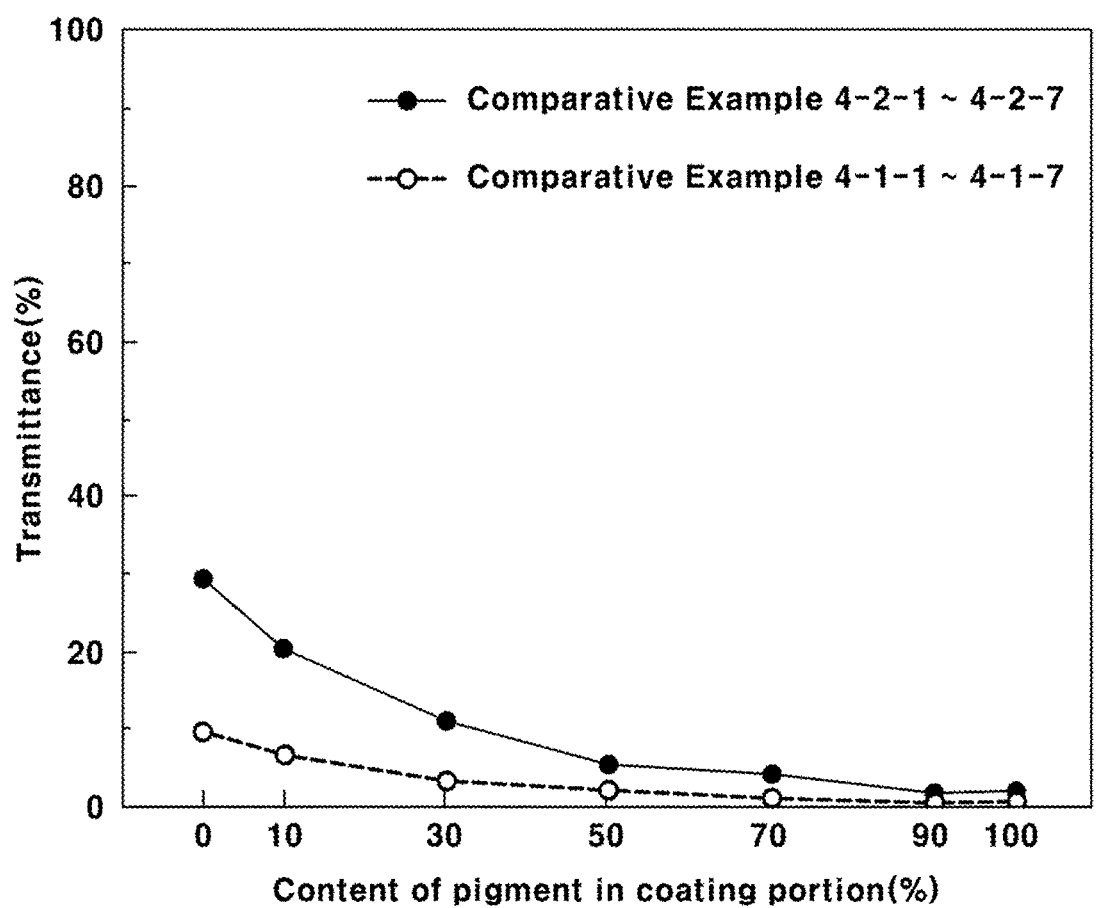
FIG. 5D is a graph showing the result of measuring the transmittance of the three-dimensional patterns emitted from the vehicle panels according to Comparative Examples 4-1-1 to 4-1-7 and Comparative Examples 4-2-1 to 4-2-7.

As a result, as can be seen from FIGS. 4A and 5A, the three-dimensional texture of the three-dimensional patterns emitted from the vehicle panels according to Examples 1-1-1 to 1-2-3 was excellent, even in the front.

On the other hand, as shown in FIGS. 4B, 4C, 5B, and 5C, in Comparative Examples 2-1-1 to 2-2-7 and Comparative Examples 3-1-1 to 3-2-7, wherein the amount of pigment contained in the coating portion exceeded 4.5% by weight (70%), the luminance was less than 0.5 cd/m$^2$, transmittance was less than 1%, and the lighting effect was deteriorated, and thus the three-dimensional texture of the three-dimensional pattern is not clearly identified. When the pigment contained in the coating portion was less than 4.5% by weight (70%), the luminance and transmittance were sufficient to realize the three-dimensional pattern, but a problem of deteriorated three-dimensional texture resulted due to poor expression of the edge of the pattern, and another problem arose, in which the three-dimensional pattern can be identified with the naked eye during the day, as can be seen from the result of Experimental Example 1. Meanwhile, as shown in FIG. 3D, the vehicle panels according to Comparative Examples 4-1-1 to 4-2-7 had a relatively high pigment content in the three-dimensional pattern portion and thus deteriorated overall lighting effect, resulting in a problem in which the three-dimensional pattern was not clearly identified.

That is, it can be seen that, when the three-dimensional pattern included in the vehicle panel according to the present disclosure, which includes a three-dimensional pattern portion containing an opaque carbonate consisting of 99.994% by weight of polycarbonate and 0.006% by weight of a pigment containing carbon black and a coating portion formed to a thickness of 6 to 15 um (50%) such that it can include 1.5% to 3.5% of a pigment, emits light, the luminance is 0.5 to 6 cd/m$^2$ and the transmittance is 1 to 30%, and more preferably, the luminance is 1 to 3 cd/m$^2$ and the transmittance is 3 to 10%, so that, even when the light source is turned on at night and light is emitted to the three-dimensional pattern, the expression is excellent and the lighting effect is not reduced, and thus the three-dimensional texture of the emitted three-dimensional pattern is excellent.

EXPERIMENTAL EXAMPLE 3

Evaluation of Brightness According to Pigment Included in Three-Dimensional Pattern Portion and Pigment Included In Coating Portion The brightness of the vehicle panels according to Examples 1-1-1 to 1-2-3 was evaluated.

The brightness is a value indicating a level of brightness and darkness. The brightness (L*) has a value of 0 to 100, as L* becomes close to 0, it becomes darker, and as L* becomes close to 100, it becomes brighter.

As a result, as shown in FIGS. 6A to 6D, in the vehicle panels according to Examples 1-1-1 to 1-2-3, the brightness (L*) of the shielding portion is about 2 to about 4, which is similar to that of the high glossy coat provided in the coating portion, and the brightness (L*) of the light-emitting three-dimensional pattern was found to be 2 to 40, preferably 3 to 10.

Therefore, in the vehicle panel according to the present disclosure, the brightness of the shielding portion is about 2 to about 4, so that there is no change in brightness even when the light source is turned on, and the brightness of the three-dimensional pattern transmitted through the light-emitting portion to emit light is about 2 to about 40, which is within a relatively wide range. It was found that the three-dimensional pattern does not appear during the daytime, as shown in FIG. 7A, but, the brightness (L*), that is, the brightness of the light-emitting three-dimensional pattern, can be controlled by controlling the ingredients and content of the pigment contained in the three-dimensional pattern portion and the pigment included in the coating portion, as shown in FIG. 7B.

As is apparent from the foregoing, the vehicle panel according to the present disclosure includes a light guide plate that selectively transmits light and thus not only reduces costs required for laser cutting, but also solves problems with conventional panels, such as deteriorated quality and poor mass-productivity due to the high defect rate thereof, thereby being additionally applicable to lighting components that need light emission only partially for the pattern portion, rather than an entire-surface light-emission type.

In addition, unlike conventional simple line-type lighting, the vehicle panel according to the present disclosure has a black appearance when light is not radiated from the light source and enables a three-dimensional pattern to emit light when light is radiated therefrom, thereby providing lighting having a high-quality three-dimensional pattern.

The effects of the present disclosure are not limited to those mentioned above. It should be understood that the effects of the present disclosure include all effects that can be inferred from the description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A vehicle panel comprising:
a panel body comprising a three-dimensional pattern portion having an engraved three-dimensional pattern on a rear surface thereof;
a coating portion provided on an upper surface of the three-dimensional pattern portion; and
a lighting portion disposed inside of the panel body configured to emit light to the panel body;
wherein the lighting portion comprises:
a light guide plate provided at a position corresponding to the panel body;
a light source provided on a side of the light guide plate; and
a reflective sheet provided on an inner side of the light guide plate;
wherein the three-dimensional pattern is engraved to a depth of 0.2 mm to 1 mm;
wherein the three-dimensional pattern comprises an opaque polycarbonate;
wherein the coating portion comprises a coat selected from the group consisting of: an achromatic coat, a chromatic coat, and a combination thereof; and a pigment and
wherein the coating portion further comprises 95 to 99.5% by weight of the coat and 0.5 to 5% by weight of the pigment.

2. The vehicle panel according to claim 1, further comprising a light leakage prevention case disposed on a side of the light guide plate and provided adjacent to the light source, the light leakage prevention case being configured to block external emission of light.

3. The vehicle panel according to claim 1, wherein the three-dimensional pattern comprises a plurality of cells recessed perpendicularly or obliquely toward an upper surface from a rear surface thereof; and
wherein each cell has:
a side surface recessed perpendicularly or obliquely; and
a bottom surface having a predetermined shape partitioned by the side surface.

4. The vehicle panel according to claim 3, wherein the bottom surface has a shape selected from the group consisting of: square, diamond, hemispherical, circular and oval shapes and a combination thereof.

5. The vehicle panel according to claim 1, wherein the opaque polycarbonate comprises:
99. 991 to 99.9997% by weight of polycarbonate; and
0.003 to 0.009% by weight of a pigment containing carbon black.

6. The vehicle panel according to claim 1, wherein the coating portion has a thickness of 2 μm to 22 μm.

7. The vehicle panel according to claim 1, wherein the light guide plate comprises, on the light guide plate, a light-transmissive portion having an area corresponding to an area of a cell of the three-dimensional pattern portion; and
a shielding portion having an area corresponding to an area excluding the area of the cell of the three-dimensional pattern portion.

8. The vehicle panel according to claim 7, wherein the shielding portion is formed by adhering a printed film on the light guide plate, or printing a film on the light guide plate.

9. The vehicle panel according to claim 8, wherein the film comprises one selected from the group consisting of: polycarbonate (PC), polymethyl methacrylate (PMMA), polyethylene terephthalate (PET) and combinations thereof.

10. The vehicle panel according to claim 1, wherein light is incident upon the light guide plate from the light source, the incident light is reflected by the reflective sheet, and the reflected light passes through the light-transmissive portion of the light guide plate and is emitted to the panel body to enable the three-dimensional pattern to emit light.

11. The vehicle panel according to claim 10, wherein the light-emitting three-dimensional pattern has a luminance of 0.5 to 6 cd/m2, a transmittance of 1 to 30% and a brightness (L*) of 2 to 40.

12. The vehicle panel according to claim 11, wherein a brightness of the light-emitting three-dimensional pattern is controlled by controlling the brightness (L*).

13. The vehicle panel according to claim 1, wherein the vehicle panel is selected from the group consisting of: a garnish for interior parts, a bumper garnish, a rear garnish, a tailgate garnish, a front garnish, a side garnish, a filler garnish, a fender garnish, a side-step garnish, a front door molding, a front rear molding, a bumper molding, a door scuff, a label and a combination thereof.

* * * * *